United States Patent
Okada

[15] 3,652,824
[45] Mar. 28, 1972

[54] DC ARC WELDER
[72] Inventor: Toshiyuki Okada, Osaka Japan
[73] Assignee: The Osaka Transformer Co., Ltd., Osaka-Osaka-Prefecture, Japan
[22] Filed: Dec. 9, 1969
[21] Appl. No.: 883,447

[30] Foreign Application Priority Data
Dec. 13, 1968 Japan..................................43/90932

[52] U.S. Cl..........................219/131 WR, 323/43.5, 323/48
[51] Int. Cl..........................................................B23k 9/01
[58] Field of Search.....................219/131, 116; 323/48, 43.5

[56] References Cited

UNITED STATES PATENTS

| | | |
|---|---|---|
| 3,308,265 | 3/1967 | Hobart..................................219/131 |
| 2,719,234 | 9/1955 | Wright, Jr..............................323/43.5 |
| 2,691,753 | 10/1954 | Ames et al.............................323/43.5 |
| 3,195,038 | 7/1965 | Fry.........................................323/43.5 |
| 3,255,403 | 6/1966 | Beaver et al..........................323/43.5 |
| 3,350,630 | 10/1967 | Yasunosuke Torii..................323/43.5 |
| 3,365,655 | 1/1968 | Simpson et al........................323/43.5 |

Primary Examiner—J. V. Truhe
Assistant Examiner—George A. Montanye
Attorney—Watson, Leavenworth & Kelton

[57] ABSTRACT

A DC welding system wherein DC power is applied to an electrode through a rectifier and the output of the rectifier is controlled by a transformer tap-changing system supplying power from a supply transformer through a second transformer in series with the rectifier. The tap changing system is controlled by selectively applying power to controlling relay coils through a diode matrix.

1 Claims, 7 Drawing Figures

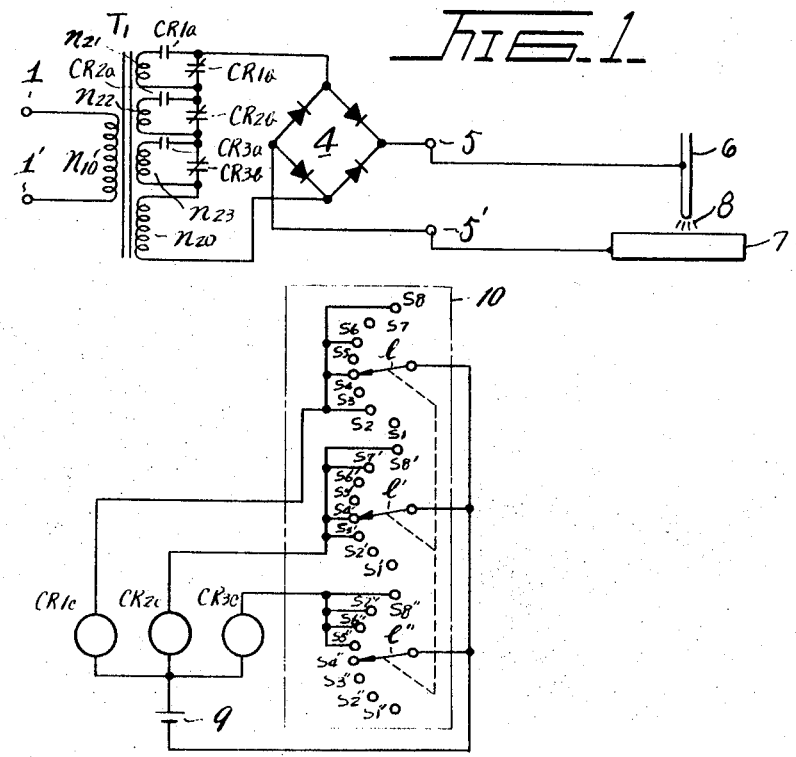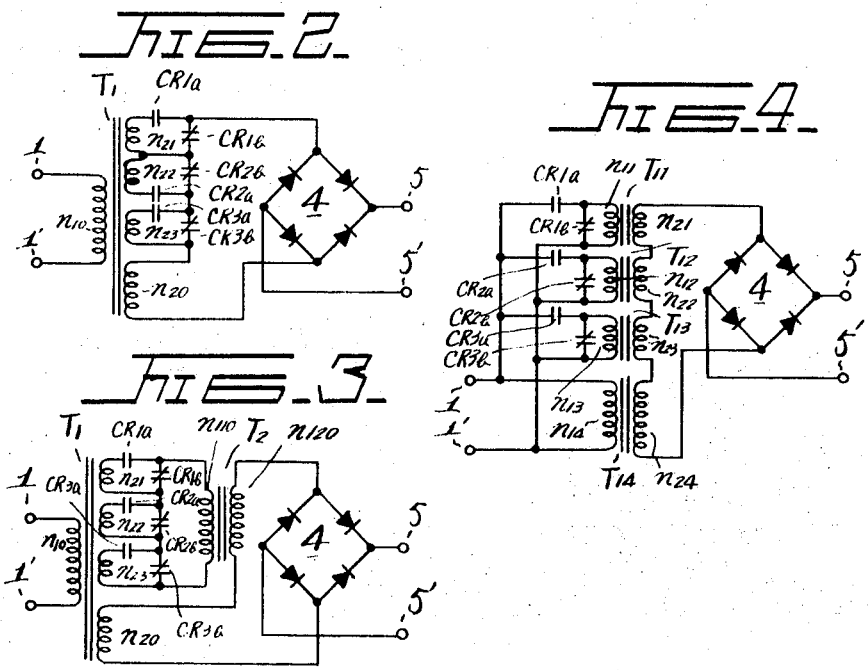

3,652,824

1

DC ARC WELDER

BACKGROUND OF THE INVENTION

In one of the conventional DC arc welders incorporating a tap-change type welding transformer capable of generating a number of different output voltages, such a welding transformer included a primary winding having several taps and a secondary winding. In such a conventional DC arc welder, for changing the taps from one to another there has been provided a changing switch which comprises several stationary contacts and one movable contactor and these stationary contacts are respectively connected to several taps on the primary winding of the welding transformer, respectively. An AC power supply is connected to the movable contactor of the changing switch and the input terminal of the primary winding of the welding transformer. The secondary winding of the welding transformer is connected to the input of a full wave rectifier the output of which is connected to an electrode and a workpiece. This conventional tap-change type welder is adapted to obtain a desired output on the welding transformer by connecting the movable contactor of the tap changing switch with a selected one of the several stationary contacts. However, in this type of welder it is necessary to provide a welding transformer having the same number of taps as the number of stages adjusting output voltage and it is also necessary to employ a tap changing switch having a large capacity capable of allowing input current (primary current) corresponding to welding current. Furthermore, the number of stages for adjusting output voltage is limited to that corresponding to the number of taps of the primary winding of the welding transformer and therefore, fine adjustment of the output voltage can not be obtained. In addition, when tap changing is carried out on the welding zone for adjusting welding conditions during a welding operation, in addition to a cable through which welding current is to be allowed to flow, additional cables the number of which corresponds to that of the taps have to be guided to the welding zone so that input current corresponding to welding current is allowed to flow through these additional cables and such a conventional tap-change type welder is unsatisfactory as a practical welder.

SUMMARY OF THE INVENTION

The present invention relates to a DC arc welder and more particularly, to a DC arc welder which incorporates a tap-changing type welding transformer capable of generating a number of different output voltages.

A principal object of the present invention is to increase the number of stages for adjusting output voltage on a welding transformer without increasing the number of taps on the primary winding of the transformer whereby finer adjustment of output voltage can be obtained.

Another object of the present invention is to increase the number of stages for adjusting output voltage on a welding transformer by means of a changing switch having a minimum number of stationary contacts as much as practicable. For electrically isolating the changing switch from the welding transformer, the switch is adapted to excite relays which are adapted to control the windings of the transformer and is required to have only a small capacity just enough to allow relay current to flow therethrough. Since the changing switch has a small number of stationary contacts it is only required that a correspondingly small number of cables be guided to the welding zone.

The above and other objects and attendant advantages of the present invention will be more readily apparent to those skilled in the art from a reading of the following description in connection with the accompanying drawings.

BRIEF DESCRIPTION OF THE DRAWINGS

FIG. 1 is a schematic diagram of a first or preferred embodiment comprising a circuit incorporating a welding transformer, relays for controlling said transformer and changing switches for selectively exciting said relays according to the present invention;

FIG. 2 is a schematic diagram of a modified form of circuit incorporating said welding transformer of FIG. 1;

FIG. 3 is a schematic diagram of a further modified form of circuit further incorporating an auxiliary transformer in addition to said welding transformer of FIG. 1;

FIG. 4 is a schematic diagram of a still further modified form of circuit incorporating four transformers in combination;

PREFERRED EMBODIMENTS OF THE INVENTION

Figure 5:
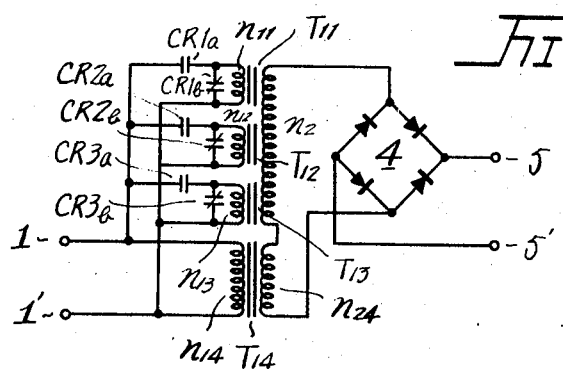
FIG. 5 is a schematic diagram of a still further modified form of circuit which is substantially identical with that of FIG. 4 except that three transformers are adapted to cooperate with a common secondary winding in the circuit.

The present invention will be now described referring to the accompanying drawings and more particularly to FIG. 1 thereof which shows a first or preferred embodiment of the invention. In FIG. 1, the symbol T1 denotes a welding transformer. The welding transformer T1 includes a primary or input winding N10 connected to input terminals 1, 1' and four secondary or output windings N21, N22, N23 and N20 which are individually wound on their respective iron cores in the same direction. The primary and secondary windings are wound on a common iron core. The secondary windings N21, N22 and N23 have different numbers of turns, respectively and the numbers of turns of these secondary windings have a geometric series relationship wherein the common ratio is 2, that is, $N22 = 2N21$ and $N23 = 4N21$. The secondary winding N20 has a number of turns greater than any of the other secondary windings. The opposite ends of the secondary windings N21, N22 and N23 are connected through normally opened relay contacts CR1a, CR2a and CR3a, respectively, to normally closed contacts CR1b, CR2b and CR3b, respectively. These contacts CR1b, CR2b and CR3b are in series connected to each other. The contact CR1b is connected to one input of a full wave rectifier 4 while the contact CR3b is connected to one end of the secondary winding N20 the other end of which is connected to the other input of the full wave rectifier 4. Numerals 5, 5' denote two DC output terminals of the full wave rectifier 4. By connecting the output terminals of the full wave rectifier 4 to an electrode 6 and a workpiece 7, respectively, and electric arc 8 is established between the electrode and workpiece. FIG. 2 shows a modified welding circuit component which is similar to that of FIG. 1 except that the secondary windings N21 and N22 of the welding transformer T1 are connected to each other in a continuous relationship, and the relay contacts CR1a and CR1b are connected to the opposite ends of the secondary windings N21 and N22, respectively.

At the bottom of FIG. 1, relay coils CR1C, CR2C, and CR3C for operating the relay contacts CR1a, CR1b, CR2a, CR2b, CR3a and CR3b, respectively; a DC power supply or battery 9; and means 10 for selecting the relay coils are shown. The relay coil selecting means 10 comprises a plurality of multiple changing switches which are respectively associated with the relay coils CR1c, CR2c and CR3c, respectively. As shown, each of the multiple changing switches comprises eight stationary contacts arranged along a sector of a circle and a movable contactor which is adapted to selectively contact with one of the stationary contacts at one time. The positive side of the battery 9 is connected to one ends of the relay coils CR1c - CR3c while the negative side of the battery is adapted to be respectively connected to the movable contactors l, l' and l" of the three multiple changing switches, respectively.

The other end of the relay coil CR1c is connected to the stationary contacts S2, S4, S6 and S8 of the first one the three multiple changing switches while the other end of the relay coil CR2c is connected to the stationary contacts S2', S4', S7' and S8' of the second one of the three multiple changing switches. Furthermore, the other end of the relay coil CR3c is also connected to the stationary contacts S5", S6", S7" and S8" of the third or last one of the multiple changing switches. The movable contactors $l$, $l'$ and $l''$ of the three multiple changing switches are respectively connected to a common drive means so hat these movable contactors may be simultaneously connected to the stationary contacts which bear the corresponding numerals after the common symbol "S". Thus, by moving the movable contactor of each of the three multiple changing switches, the relay coils CR1c - CR3c can be selectively excited.

In the welder shown in FIG. 1, assuming that the voltages induced in the secondary windings N21, N22, N23 and N20 are V1, V2, V3 and V4, respectively, since the numbers of turns of the secondary windings N21, N22 and N23 are selected in the manner mentioned above, the relationship such as $V2 \doteq 2V1$ and $V3 \doteq 4V1$ exists. The relay coil selecting means 10 is adapted either not to excite any of the relay coils CR1c - CR3c or to selectively excite the relay coils CR1c - CR3c. Thus, the welder of FIG. 1 is so designed that either only the secondary winding N20 of the welding transformer may be excited or both the secondary N20 and one or more of the remaining secondary windings in combination may be excited.

For example, when the movable contactors $l$, $l'$ and $l''$ of the relay coil selecting means 10 are respectively contacted with the stationary contacts S4, S4' and S4", respectively, the relay coils CR1c and CR2c are excited whereby the normally open contacts CR1a and CR2a are closed while the normally closed contacts CR1b and CR2b are opened. Thus, the secondary windings N21 and N22 are selected and therefore, DC voltage of $V20 + V1 + V2 \doteq V20 + 3V1$ develops between the output terminals 5 and 5' of the welder. The relay coils CR1c - CR3c may be selected in eight different ways depending upon the contacting positions of the movable contactors $l$, $l'$ and $l''$ of the relay coil selecting means 10 and accordingly, the secondary windings N21 - N23 may be also selected in eight different ways. The following Table 1 shows relationships between the contacting positions of the movable contactors and the voltages appearing at the output terminals of the welder.

Referring now to FIG. 3 in which a modified embodiment of the invention is shown. The circuit of FIG. 3 incorporates an auxiliary transformer T2 in addition to the welding transformer T1 identical with that shown in FIG. 1. The primary winding n110 of the auxiliary transformer T2 is connected through relay contacts CR1a, CR2a and CR3a to the selective secondary windings n21 - n23 of the main transformer T1. One end of the secondary winding n120 of the auxiliary transformer T2 is connected to one end of the normally operative secondary winding n20 the other end of which is connected to one of inputs of the full wave rectifier 4. The other end of the secondary winding n120 of the auxiliary transformer T2 is connected to the other input of the full wave rectifier 4. In this case, the secondary winding n20 of the main transformer T1 and the secondary winding n120 of the auxiliary transformer T2 must be cumulatively connected to each other. The output voltage adjustment by the welding circuit of FIG. 3 is substantially identical with that by the welding circuit of FIG. 1 except that the outputs of the divided windings n21 - n23 excite the auxiliary transformer T2. Therefore, when the welding circuit component of FIG. 3 is operated to obtain the same output as obtainable in the welding circuit component of FIG. 1, in the circuit of FIG. 3 the value of output voltage of the secondary windings n21 - n23 of the main transformer T1 may be smaller than that of the corresponding secondary windings of the welding transformer in the circuit of FIG. 1. This implies that the relay contacts connected to these secondary windings are required to break-off smaller current than that which must be broken-off by the corresponding relay contacts in the circuit of FIG. 1.

FIG. 4 shows a further modified embodiment of welding circuit component incorporating four independent transformers T11 - T14. The primary windings n11 - n13 of the transformers T11 - T13 are respectively connected through normally opened relay contacts CR1a, CR2a and CR3a to input terminals 1, 1', respectively. The primary winding n14 of the transformer T14 is directly connected to the input terminals 1, 1'. The secondary windings n21 - n24 of the transformers T11 – T14 are in series connected to the input of the full wave rectifier 4 the output of which is connected to the output terminals 5, 5'. When used in combination with the relay coil selecting means 10 as shown at the bottom of FIG. 1, the welding circuit component of FIG. 4 can also adjust output voltage in the same way as the embodiment of FIG. 1. Also in the em-

TABLE 1

| Position of movable contractor | Relay coil | | | Output voltage |
| --- | --- | --- | --- | --- |
| | CR1c | CR2c | CR3c | |
| S1 S1' S1" | Nonexcitation | Nonexcitation | Nonexcitation | V20+0+0+0=V20 |
| S2 S2' S2" | Excitation | do | do | V20+V1+0+0=V20+V1 |
| S3 S3' S3" | Nonexcitation | Excitation | do | V20+0+V2+0÷V20+2V1 |
| S4 S4' S4" | Excitation | do | do | V20+V1+V2+0÷V20+3V1 |
| S5 S5' S5" | Nonexcitation | Nonexcitation | Excitation | V20+0+0+V3÷V20+4V1 |
| S6 S6' S6" | Excitation | do | do | V20+V1+0+V3÷V20+5V1 |
| S7 S7' S7" | Nonexcitation | Excitation | do | V20+0+V2+V3÷V20+6V1 |
| S8 S8' S8" | Excitation | do | do | V20+V1+V2+V3÷V20+7V1 |

As clear from the above Table, eight stages for adjusting output voltage can be obtained depending upon the contacting position of the movable contactors of the relay coil selecting means 10 and in this case the minimum value is V20 whereas the maximum value is V20 +7V1. From a reading of the description in connection with embodiments shown in FIGS. 1 and 2 it will be apparent to those skilled in the art that when the welding transformer comprising one normally operative output winding and four selective output windings and the relay coil selecting means comprising four relays and four multiple changing switches are combined 16 stages for adjusting output voltage can be obtained and that when the welding transformer comprising one normally operative output winding and seven selective output windings and the relay coil selecting means comprising seven relays and seven multiple changing switches are combined two hundred and 56 stages for adjusting output voltage can be obtained.

bodiment of FIG. 4, it will be apparent that the relay contacts are only required to break-off smaller current than that to be broken-off by the corresponding relay contacts in the embodiment of FIG. 1.

FIG. 5 shows a further modified embodiment of welding circuit component in which welding transformers T11, T12 and T13 similar to those shown in FIG. 4 have a common secondary winding N2. While the transformers T11, T12 and T13 are magnetically independent, the legs of the iron cores in these transformers on which primary windings are wound are disposed in a closely spaced relation to one another. Primary windings N11, N12 and N13 are respectively wound on the transformer cores and the above-mentioned common secondary winding N2 is wound surrounding all the primary windings N11, N12 and N13. The secondary winding N2 and the secondary winding N24 of the transformer T14 are in series connected to the input of the full wave rectifier 4 the output of which is connected to the output terminals 5, 5'. The operation of the embodiment of FIG. 5 is substantially the same as that of embodiment of FIG. 4

Figure 6:
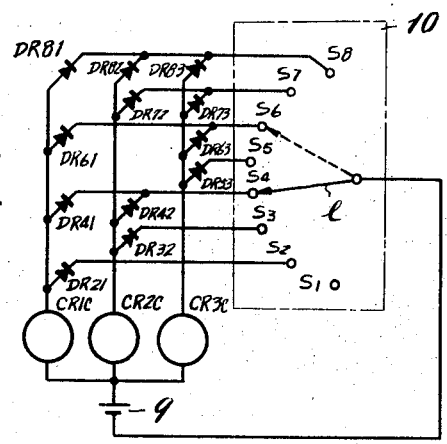
FIG. 6 is a schematic diagram of a modified form of relay exciting circuit which is similar to the corresponding circuit of FIG. 1 except that only one changing switch is employed therein.

FIG. 6 shows a modification of the relay exciting circuit as shown at the bottom of FIG. 1. The circuit of FIG. 6 comprises relay coils CR1c - CR3c, a battery or DC power supply 9 and a relay coil selecting means 10 comprising one multiple changing switch. The multiple changing switch comprises eight stationary contacts arranged along a sector of a circle and a movable contactor adapted to selectively contact with one of the stationary contacts at one time. The positive side of the battery 9 is connected to one ends of the relay coils CR1c - CR3c and the negative side of the battery is connected to the movable contactor l of the relay coil selecting means 10. The other end of the relay coil CR1c is connected through a diode DR21 to the stationary contact S2 of the multiple changing switch. The other end of the relay coil CR1c is also connected through a diode DR41 to the stationary contact S4, through a diode DR61 to the stationary contact S6 and through a diode DR81 to the stationary contact S8. Similarly, the other end of the relay coil CR2c is connected through diodes DR32, DR42, DR72 and DR82, respectively, to the stationary contacts S3, S4, S7 and S8, respectively. Similarly, the other end of the relay coil CR3c is connected through diodes DR53, DR63, DR73 and DR83, respectively, to the stationary contacts S5, S6, S7 and S8, respectively. Thus, the relay exciting circuit of FIG. 6 can also selectively excite the relay coils by means of the relay coil selecting means 10. As apparent to those skilled in the art, if desired, the diodes DR21, DR32 and DR53 can be eliminated. In the relay exciting circuit of FIG. 6, since the relay coil selecting means comprises one multiple changing switch, the relay coil selecting means of FIG. 6 is simpler in construction and simpler in operation than the corresponding means shown in FIG. 1.

Figure 7:
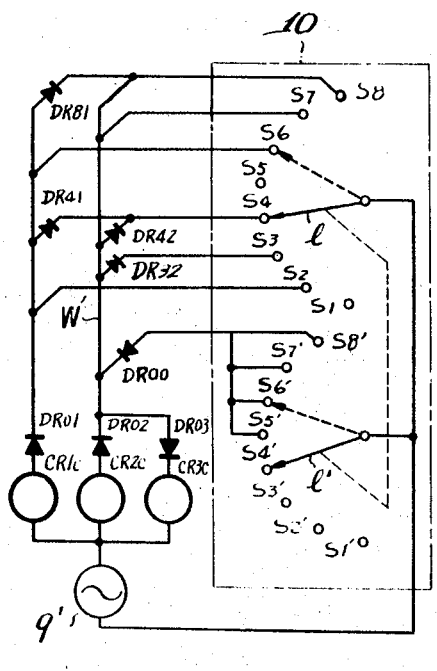
FIG. 7 is a schematic diagram of a further modified form of relay exciting circuit which is similar to the corresponding circuit of FIG. 1 except that an AC power supply is employed in place of the DC power supply and two changing switches are employed therein.

FIG. 7 shows a further modified embodiment of relay exciting circuit which incorporates a AC power supply in place of the DC power supply as employed in the circuit of FIG. 1. The relay exciting circuit of FIG. 7 incorporates a relay coil selecting means 10 comprising two multiple changing switches. The two multiple changing switches are identical in construction with those employed in the relay coil selecting means as shown in FIGS. 1 and 6, respectively. One end of the AC power supply 9' is connected to one ends of relay coils CR1c - CR3c whereas the other end of the AC power supply is connected to the movable contactors l and l' of the two multiple changing switches. The other end of the relay coil CR1c is connected to the anode of a diode DR01 and the other end of the relay coil CR2c is connected to the anode of a diode DR02. Similarly, the other end of the relay coil CR3c is connected to the cathode of a diode DR03. The cathode of the diode DR01 is connected to the stationary contacts S2 and S6 of one or the first multiple changing switches and also to the anodes of diodes DR41 and DR81 the cathodes of which are in turn connected to the stationary contacts S4 and S8 of the first multiple changing switch. The cathode of a diode DR2c is connected to the stationary contacts S7 and S8 of the first multiple changing switch and also to the anodes of diodes DR32 and DR42 the cathodes of which are in turn connected to the stationary contacts S3 and S4. The anode of a diode DR03 is connected to the cathode of a diode DR00 the anode of which is connected to the stationary contacts S5' - S8' of the other or second multiple changing switch. In the embodiment illustrated in FIG. 7, the cathode of the diode DR02 and the anode of the diode DR03 are directly connected to each other eliminating a conductor which is to be exclusively employed for the relay coil CR3c. It will be apparent that also in the relay exciting circuit of FIG. 7 the circuit can selectively excite the relay coils CR1c - CR3c by connecting the movable contactors l and l' with the correspondingly numbered stationary contacts by means of a common drive means. As those skilled in the art understand easily, when polarized relays are employed for the relay coils CR1c - CR3c the diodes DR01, DR02 and DR03 may be eliminated.

In the foregoing description has been made of various embodiments of welding transformers and relay coil exciting circuits, respectively, it will be readily occurred to those skilled in the art that these modifications can be combined in various different ways other than those shown and it will be also understood that they are for illustration purpose only and are not to be taken as a definition of the invention, reference being had for this purpose to the appended claims.

What I claim is:

1. In a DC arc welder:
    a. an electrode;
    b. a conductor connectable to a workpiece;
    c. rectifier means having a pair of output terminals connected respectively to said electrode and to said conductor and a pair of input terminals;
    d. voltage transformer means including
        1. a first transformer having a primary winding and a plurality of secondary winding circuits each comprising in series circuit a secondary winding and a set of normally open relay contacts, and a set of normally closed relay contacts connected in parallel with said series circuit, and a further secondary winding;
        2. means connecting the normally closed relay contact sets of said secondary winding circuits in series; and
        3. a second transformer having a primary winding connected to said means (d) (2) and a secondary winding connected in series with said first transformer further secondary winding and said rectifier means input terminals; and
    e. control means including
        1. a plurality of control relays, each having a coil with first and second terminals operating the sets of normally open and normally closed relay contacts of a one of said secondary winding circuits;
        2. a voltage supply having first and second terminals;
        3. means connecting each of said coil second terminals to said supply second terminal;
        4. a plurality of diodes, each having a first terminal connected to a one of said coil first terminals, and a second terminal; and
        5. a controller having a movable contact connected to said supply first terminal and a plurality of stationary contacts connected to said diode second terminals, said controller being operative to selectively energize said control relays through said diodes, thereby controlling said voltage transformer means and arc intensity between said electrode and said workpiece.

* * * * *